(12) United States Patent
Ishii et al.

(10) Patent No.: US 7,470,476 B2
(45) Date of Patent: Dec. 30, 2008

(54) GLASS SUBSTRATE FOR MAGNETIC RECORDING MEDIUM AND METHOD FOR MANUFACTURING THE SAME

(75) Inventors: Norimasa Ishii, Osaka (JP); Kazuishi Mitani, Osaka (JP); Yasuhiro Saito, Osaka (JP); Koji Okuhata, Osaka (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 10/532,550

(22) PCT Filed: Oct. 22, 2003

(86) PCT No.: PCT/JP03/13462

§ 371 (c)(1), (2), (4) Date: Aug. 17, 2005

(87) PCT Pub. No.: WO2004/042710

PCT Pub. Date: May 21, 2004

(65) Prior Publication Data

US 2006/0194080 A1 Aug. 31, 2006

(30) Foreign Application Priority Data

Oct. 23, 2002 (JP) .............................. 2002-308813
Dec. 27, 2002 (JP) .............................. 2002-379004

(51) Int. Cl.
*B32B 17/00* (2006.01)
*G11B 5/71* (2006.01)
*G11B 5/58* (2006.01)

(52) U.S. Cl. ................. 428/846.9; 428/848.2; 428/410; 360/135

(58) Field of Classification Search .............. 428/846.9, 428/848, 848.2, 848.3, 410, 425.6, 426; 451/63; 65/30.14, 31; 501/11; 360/135
See application file for complete search history.

(56) References Cited

U.S. PATENT DOCUMENTS 6,383,404 B1 5/2002 Sakai et al.
(Continued)

FOREIGN PATENT DOCUMENTS

JP 5/342532 12/1993
(Continued)

OTHER PUBLICATIONS

Translation: JA 2002-251716.*
(Continued)

*Primary Examiner*—Carol Chaney
*Assistant Examiner*—Louis Falasco
(74) *Attorney, Agent, or Firm*—Workman Nydegger

(57) ABSTRACT

A glass substrate for a magnetic recording medium is formed to have a disc shape and includes ridge shaped textures 13 extending along concentric circles on a main surface. When measuring a 10 μm square range with an atomic force microscope, the textures have a width W that is between 10 and 200 nm. The textures have a height H that is between 2 and 10 nm. Further, the textures have a ratio (Rp/RMs) of a maximum mountain height with respect to a root mean square roughness that is less than or equal to 15. The textures include high frequency components superimposed on the low frequency components. It is preferable that the textures of the high frequency components have a width W' that is between 0.1 and 20 nm, and the textures of the high frequency components have a height H' that is between 0.1 and 1 nm.

6 Claims, 6 Drawing Sheets

U.S. PATENT DOCUMENTS

| | | | |
|---|---|---|---|
| 6,491,572 B1 * | 12/2002 | Horie et al. | 451/63 |
| 6,537,648 B1 * | 3/2003 | Takahashi et al. | 428/846.9 |
| 6,576,353 B1 * | 6/2003 | Mitani et al. | 428/846.9 |
| 6,715,318 B2 | 4/2004 | Mitani et al. | |
| 2002/0055017 A1 | 5/2002 | Fukushima et al. | |
| 2002/0127432 A1 | 9/2002 | Saito et al. | 428/694 |
| 2003/0164005 A1 * | 9/2003 | Saito et al. | 65/30.14 |

FOREIGN PATENT DOCUMENTS

| | | | |
|---|---|---|---|
| JP | 07-006360 | * | 1/1995 |
| JP | 07-006361 | * | 1/1995 |
| JP | 09-035261 | * | 2/1997 |
| JP | 11-003513 | | 1/1999 |
| JP | 2001-101649 | | 4/2001 |
| JP | 2001/341058 | | 12/2001 |
| JP | 02-032909 | | 1/2002 |
| JP | 2002/251716 | | 6/2002 |

OTHER PUBLICATIONS

Translation: JA 2002-032909.*

Translation: JA 05-342532.*

U.S. Appl. No. 10/532,564 entitled "Glass Substrate for Information Recording Medium and Method for Manufacturing Same," filed Apr. 22, 2005.

U.S. Appl. No. 10/532,538 entitled "Glass Substrate for Information Recording Medium and Method for Manufacturing Same," filed Apr. 22, 2005.

* cited by examiner

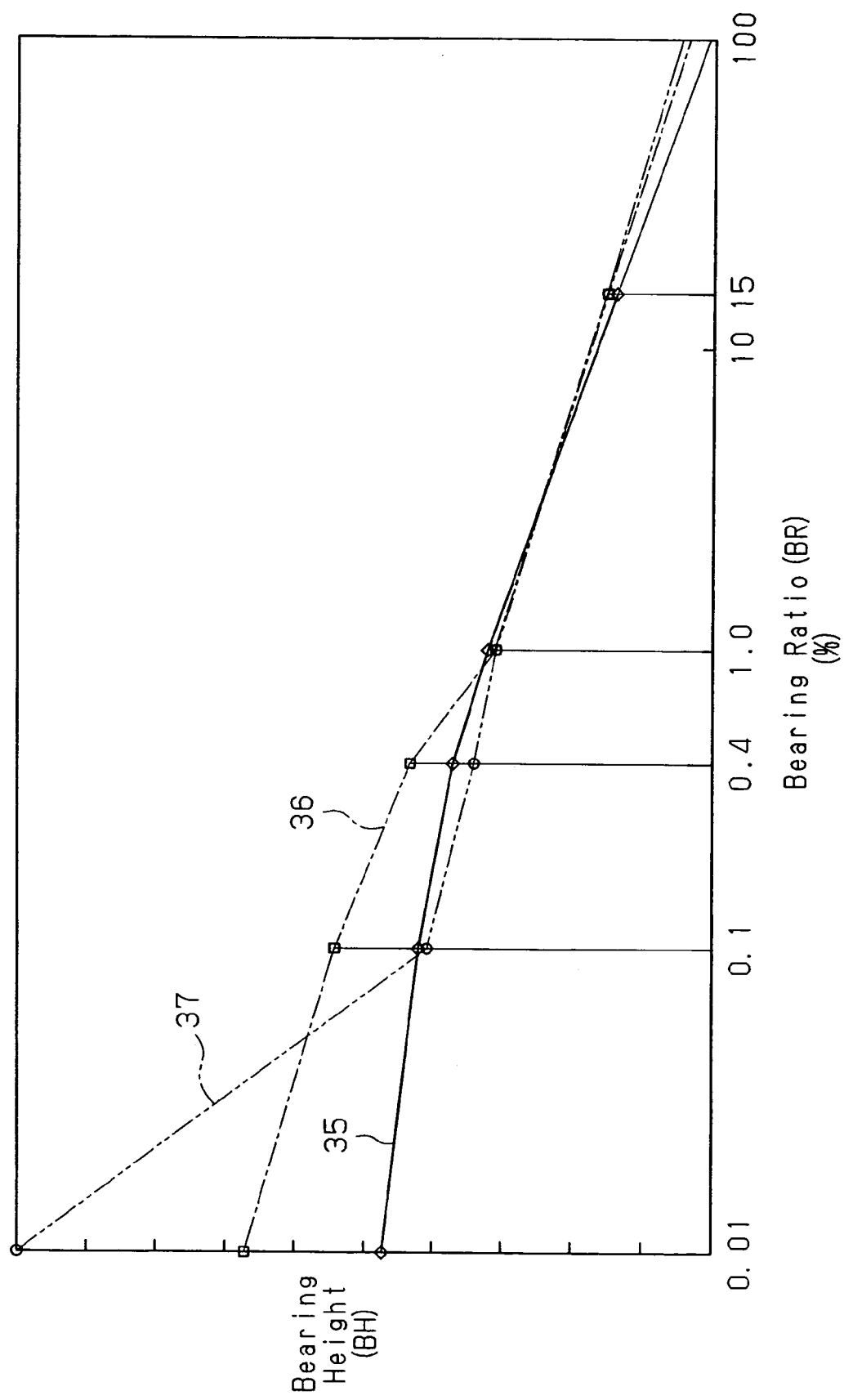

GLASS SUBSTRATE FOR MAGNETIC RECORDING MEDIUM AND METHOD FOR MANUFACTURING THE SAME

FIELD OF THE IVENTION

The present invention relates to a glass substrate for a magnetic recording medium such as a magnetic disc used as a hard disc of a computer or a magneto-optical disc, and a method for manufacturing the same. More particularly, the present invention relates to a glass substrate for a magnetic recording medium that further achieves a lower levitation amount of a magnetic head for reading magnetic data from a glass substrate surface and improves the levitation stability, and a method for manufacturing the same.

BACKGROUND OF THE INVENTION

In the prior art, a known type of such glass substrate for a magnetic recording medium is described in, for example, Japanese Laid-Open Patent Publication No. 2002-32909. The glass substrate described in this publication includes concentric pits and lands formed on a main surface. The height of the pits and lands is of a size that does not have anisotropy in a circumferential direction when at least a magnetic film is formed on the substrate. In other words, a magnetic anisotropy value expressed by a ratio (Hc1/Hc2) of coercive forces, where the coercive force in the circumferential direction is Hc1 and the coercive force in a radial direction is Hc2. The ratio is set in a range of 0.90 and 1.10.

However, in the glass substrate having a texture with a small magnetic anisotropy in which the ratio of the coercive forces is between 0.90 and 1.10, the levitation stability of a magnetic head for reading information from the glass substrate cannot be realized, and low levitation characteristic is insufficient. For the low levitation characteristic, in addition to a limit levitation characteristic (e.g., TDH), properties associated with the durability and levitation stability of the magnetic head which are evaluated in a continuous seek test or a fixed point levitation test are essential. Satisfactory low levitation characteristic is obtained only when such properties are satisfied. TDH is the abbreviation for Touch Down Height and is the levitation amount of the head when the levitation amount of the head is sequentially lowered and the head begins to contact the magnetic disk.

The present invention was made in view of the above problems existing in the prior art. It is an object of the present invention to provide a glass substrate for a magnetic recording medium that lowers the levitation amount of the magnetic head and improves the levitation stability, and to a method for manufacturing the same.

SUMMARY OF THE INVENTION

To achieve the above object, the present invention provides a glass substrate for a magnetic recording medium formed to have a disc shape and including ridge shaped textures extending along concentric circles on a main surface. The glass substrate is characterized in that the textures have a width W that is between 10 and 200 nm at a reference plane obtained by measuring a 10 μm square range with an atomic force microscope. The textures have a height H that is between 2 and 10 nm, and the textures have a ratio (Rp/RMs) of a maximum mountain height with respect to a root mean square roughness that is less than or equal to 15. The glass substrate achieves a lower levitation amount of a magnetic head and improves levitation stability.

It is preferred that the width W at a reference plane of the textures be between 10 and 20 nm. Further, in addition to the width W at the reference plane of the textures being between 10 and 20 nm, it is preferred that the height H of the textures be between 2 and 5 nm, and the ratio (Rp/Rms) of the maximum mountain height with respect to the root mean square roughness RMS of the textures be less than or equal to 3. In this case, the levitation amount of the magnetic head is further lowered, and levitation stability is improved.

It is preferred that when the textures are cut along a plane parallel to the main surface in the 10 μm square measurement range of the atomic force microscope, the percentage of the area of the cut plane with respect to the entire area of the measurement range is defined as a bearing ratio (BR), the height of the textures when the bearing ratio is 50% is defined as a reference height, and the height of the textures from the reference height in a plurality of bearing ratios is defined as a bearing height (BH), the difference between the bearing height (BH) when the bearing ratio (BR) is 0.01% and the bearing height (BH) when the bearing ratio (BR) is 0.4% be between 0.01 and 1.0 nm for the textures. In this case, projections that are abnormally projecting are decreased, the wear of the magnetic head is reduced, and levitation stability is improved.

It is preferred that the difference between the bearing height (BH) when the bearing ratio (BR) is 0.4% and the bearing height (BH) when the bearing ratio (BR) is 1.0% be between 0.15 and 0.20 nm for the textures. In this case, the same advantages as described above are obtained.

It is preferred that the difference between the bearing height (BH) when the bearing ratio (BR) is 0.01% and the bearing height (BH) when the bearing ratio (BR) is 0.4% be between 0.2 and 0.7 nm, and the difference between the bearing height (BH) when the bearing ratio (BR) is 0.4% and the bearing height (BH) when the bearing ratio (BR) is 1.0% be between 0.17 and 0.20 nm for the textures. This case also has the same advantages as described above.

It is preferred that the difference between the bearing height (BH) when the bearing ratio (BR) is 0.4% and the bearing height (BH) when the bearing ratio (BR) is 1.0% is less than the difference between the bearing height (BH) when the bearing ratio (BR) is 1.0% and the bearing height (BH) when the bearing ratio (BR) is 15% for the textures. This case also has the same advantages as described above.

It is preferred that an average depth D of depressions of the textures in the 10 μm square measurement range of the atomic force microscope be less than or equal to 2 nm, and a ratio H/D of a height H with respect to the average depth D of the depressions of the textures be greater than or equal to 10.

It is preferred that the textures include low frequency components, obtained in the 10 μm square measurement range of the atomic force microscope, and high frequency components, obtained in a 1 μm square or 0.1 μm square measurement range of the atomic force microscope, superimposed on the low frequency components, and being finer than the low frequency components, and that the textures of the high frequency components have a width W' that is between 0.1 and 20 nm, and the textures of the high frequency components have a height H' that is between 0.1 and 1 nm. In this case, the magnetic anisotropy is enhanced, and the magnetic recording density at the textures is increased.

It is preferred that the width W' of the textures of the high frequency components be between 1 and 5 nm, and the height H' of the textures of the high frequency components be between 0.3 and 0.8 nm.

It is preferred that the textures in the 10 μm square measurement range of the atomic force microscope have a maximum valley depth Rv of 10 nm or less. In this case, local magnetic anisotropy is prevented from being lowered.

It is preferred that the ratio (Hv1/Hc2) of a coercive force Hc1 in a circumferential direction with respect to a coercive force Hc2 in a radial direction be greater than 1.1 and less than or equal to 1.3.

It is preferred that the ratio (Rp/RMs) of a maximum mountain height Rp with respect to a root mean square roughness RMS of the textures be less than or equal to 5.

Another aspect of the present invention provides a method for manufacturing a glass substrate for a magnetic recording medium. The manufacturing method includes a disc machining process for machining a sheet of glass material into a disc shape, a polishing process for polishing a main surface of the disc-shaped glass substrate with a polishing member, a washing process for washing off residual polishing agent from the main surface of the glass substrate, and a texture formation process for forming textures on the main surface of the washed glass substrate. The method is characterized in that an arithmetic mean roughness Ra of the main surface of the washed glass substrate indicates a value of between 0.35 and 1.0 nm when a 10 μm square range is measured with the atomic force microscope. This method facilitates the manufacturing of a glass substrate including textures having a uniform shape.

It is preferred that a chemical strengthening process for chemically strengthening the glass substrate be included before the texture formation process.

BRIEF DESCRIPTION OF THE DRAWINGS

FIG. 10 is a graph showing the relationship between the bearing ratio and the bearing height.

DETAILED DESCRIPTION OF THE PREFERRED EMBODIMENTS

The embodiments of the present invention will now be described in detail with reference to the drawings.

Figure 3:
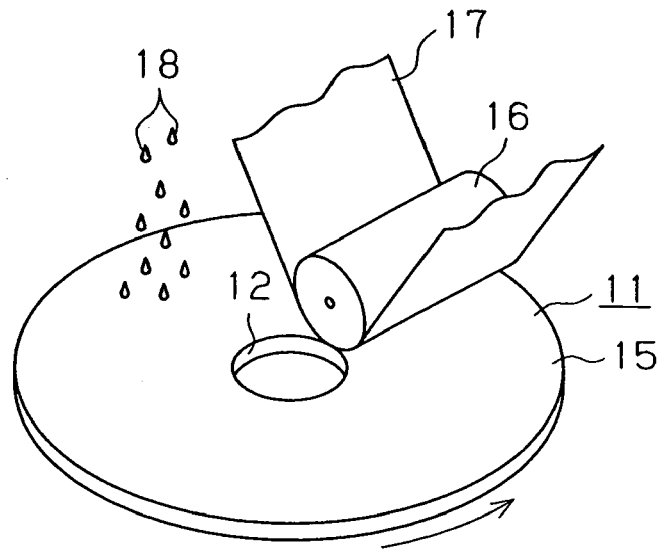
FIG. 3 is a perspective view of a device for forming textures on a main surface of a glass substrate.
Figure 4:
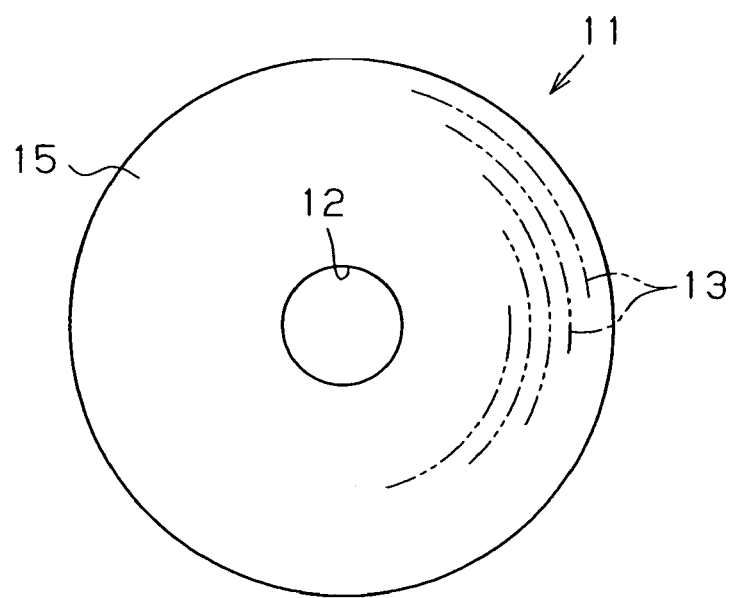
FIG. 4 is a plan view showing the main surface of the glass substrate after texture formation.

As shown in FIG. 3 and FIG. 4, a glass substrate 11 of the present embodiment is disc-shaped, includes a central circular hole 12, and is used as a magnetic recording medium such as a magnetic disc. A magnetic film, a protective film, a lubrication film, and the like made of metals or alloys of cobalt (Co), chromium (Cr), iron (Fe), etc. are formed on a main surface 15 of the glass substrate 11 to form the magnetic recording medium. The main surface 15 refers to the surface of the glass substrate in which information is recorded.

Figure 1:
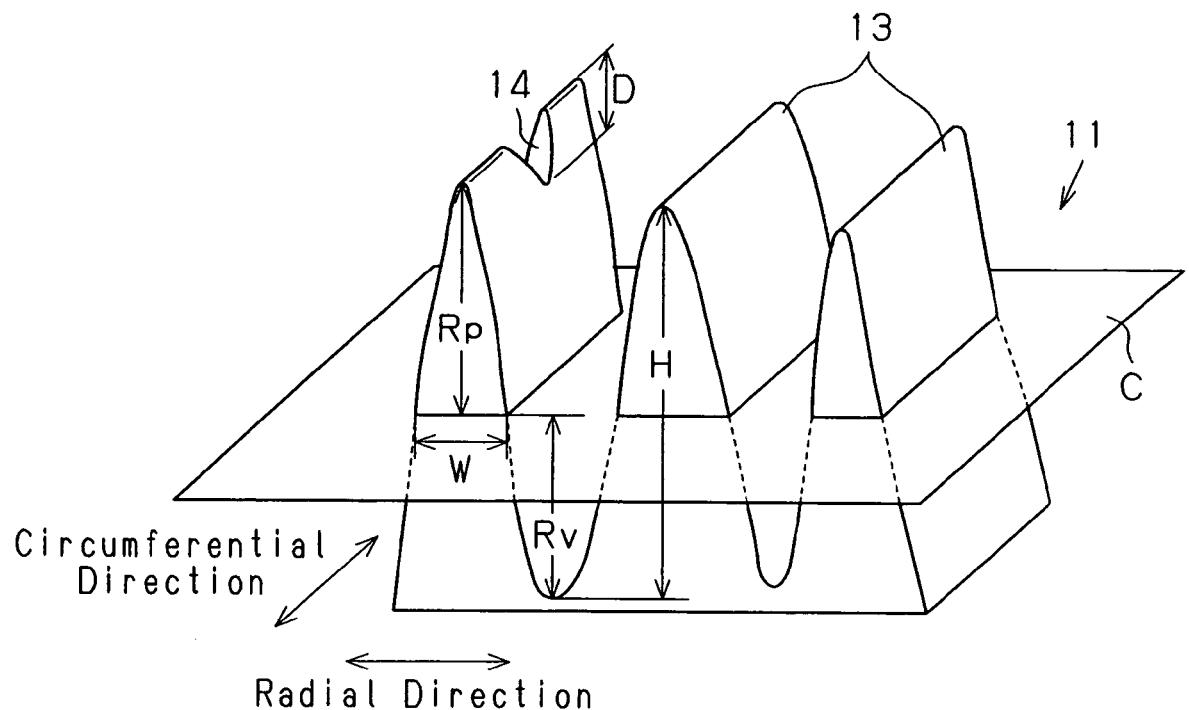
FIG. 1 is a schematic diagram showing low frequency components of textures in a first embodiment.

As shown in FIG. 4, a plurality of textures 13 extending along concentric circles are formed on the glass substrate 11. As shown in FIG. 1, the textures 13 have the shapes of ridges (mountains). The width W and the height H of the textures 13 are defined using a reference plane C as a reference.

The reference plane C is the contour plane (bearing ratio 50) corresponding to 50% of the sum of the areas of the textures 13 at a surface parallel to the main surface 15 of the glass substrate 11 in the entire area of the measurement range of an atomic force microscope (abbreviated as AFM). Information relating to the textures 13 is obtained by measuring a 10 μm (micrometer) square range with the atomic force microscope. The width W at the reference plane C of the textures 13 is between 10 to 200 nm (nanometers) and the height H of the textures 13 is between 2 to 10 nm.

The width W of the textures 13 is expressed by a value derived by dividing the length in the measurement range of the AFM by a linear density of the texture. The linear density of the texture 13, that is, the line density (Ld) is indicated by the number of times the contour line of the texture 13 traverses the reference plane C.

Figure 8:
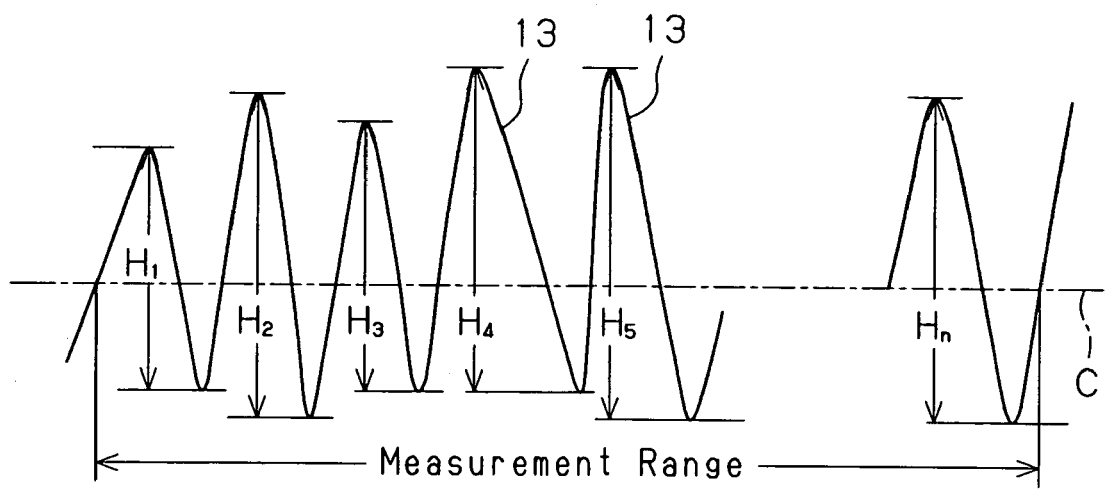
FIG. 8 is a schematic diagram showing the textures of low frequency components within a measurement range of an atomic force microscope.

As shown in FIG. 8, at the cross-section traversing the textures 13, when an n number of textures 13 exist within the measurement range of the AFM and the height from the vertex to the valley base of the textures 13 is expressed by Hi for each texture 13, the height H of the textures 13 is expressed by the following equation.

$$H = \Sigma Hi/n, \text{ where } i=1 \text{ to } n$$

The relationship between the number n of textures and the line density Ld is expressed by n=Ld/2.

Further, the textures 13 of the present embodiment are such in which the ratio (Rp/RMS) of the maximum mountain height Rp with respect to the root mean square roughness of the texture 13 is less than or equal to 15. The maximum mountain height Rp is the height from the reference plane C to the vertex of the highest texture 13 as shown in FIG. 1. The root mean square roughness RMS is a parameter defined in JIS B 0601. Such textures 13 are low frequency components and form the fundamental shape of the texture 13.

The width W of the texture 13 relates to the density of the texture 13. If the width of the texture 13 changes, wear or sticking occurs at the magnetic head for reading information (magnetic data) recorded on the surface of the glass substrate, which may lead to crash of the magnetic head. Therefore, the width of the textures 13 is an important factor.

A smaller width W of the textures 13 means a higher density of the texture 13. If the width W of the textures 13 is smaller than 10 nm, the wear of the magnetic head becomes greater and crash of the magnetic head is more likely to occur, and is thus inappropriate. On the other hand, if the width W of the texture is greater than 200 nm, sticking of the magnetic head is likely to occur, and crash of the magnetic occurs and is thus inappropriate. Therefore, the width W of the texture 13 is preferably between 10 and 20 nm. If the width W of the texture 13 is within such range, sticking of the magnetic is less likely to occur, and crash of the magnetic head does not occur even in a fixed point levitation test conducted over 72 hours, and thus is preferable.

The height H of the textures 13 relates to the coercive force of the lubrication film arranged on the outermost surface of the glass substrate and the levitation (glide) height of the magnetic head, and thus is an essential factor for its relation with the reading accuracy of the magnetic head and the crash of the magnetic head.

If the height H of the textures 13 is less than 2 nm, the grooves for holding the lubrication film on the outermost surface of the glass substrate decreases, the coercive force decreases, and the crash of the magnetic head is likely to occur. The levitation height of the magnetic head is expressed as the sum of the height H of the texture 13 and the height from the vertex of the texture to the magnetic head. Therefore, if the height H of the texture 13 is greater than 10 nm, the height of the texture 13 projecting from the reference plane C becomes approximately half (5 nm) of 10 nm, and the levitation height of the magnetic head cannot be lower than 5 nm. If the height H of the texture 13 is between 2 and 5 nm, the demand for having a recording density of 30 Gbit/in$^2$ for the magnetic recording medium is sufficiently satisfied and is thus preferable.

The ratio (Rp/RMS) of the maximum mountain height Rp with respect to the root mean square roughness RMS of the texture 13 relates to the levitation height and the levitation stability of the magnetic head and thus is an important factor. If the ratio (Rp/RMS) is greater than 15, projections having a large projecting amount relatively increase in the texture 13, the wear of the magnetic head increases, and a satisfactory levitation characteristic is not obtained. This leads to crash of the magnetic head in, for example, a continuous seek test conducted for 2000 hours or a fixed point levitation test conducted for over 24 hours.

If the ratio is less than or equal to 5, the wear of the magnetic head becomes small, and crash of the magnetic head does not occur in, for example, a continuous seek test conducted for 2000 hours or a fixed point levitation test conducted for over 72 hours, and is thus more preferable.

Further, if the ratio is less than or equal to 3, the width of the texture 13 is between 10 and 20 nm, and the height is between 2 to 5 nm, crash of the magnetic head does not occur in, for example, a fixed point levitation test conducted for over 96 hours, and is thus more preferable.

As shown in FIG. 1, the ridges of the textures 13 ideally extend continuously along the circumferential direction of the glass substrate at an even height, but in reality, undulations are formed on the ridges and depressions 14 are formed. The average depth D of the depression 14 relates to the wear of the magnetic head and the crash of the magnetic head, and thus is desirably less than or equal to 2 nm. If the average depth D is greater than 2 nm, the wear of the magnetic head increases, and crash of the magnetic head occurs in, for example, a fixed point levitation test conducted over 48 hours. If the average depth D is less than or equal to 2 nm, crash of the magnetic head does not occur in a fixed point levitation test conducted over 48 hours and is thus preferable.

In relation to the average depth D, the ratio (H/D) of the height H of the texture 13 with respect to the average depth D represents the shape in the height direction of the texture 13. The crash of the magnetic head is predicted from the size of the ratio. The ratio (H/D) is desirably greater than or equal to 10. If the ratio (H/D) is smaller than 10, projections forming uneven ridges relatively increase on the texture 13, and crash of the magnetic head occurs in for example, the fixed point levitation test conducted over 48 hours. If the ratio (H/D) is greater than or equal to 10, crash of the magnetic head in the fixed point levitation test conducted over 48 hours does not occur, and is thus preferable.

The upper limit of the ratio (H/D) is approximately 100. In consideration of the fact that the lower limit of the measurement accuracy of AFM is about 0.1 nm, when the height H is 10 nm and the average depth D is 0.1 nm, the ratio (H/D) is 100.

Figure 9:
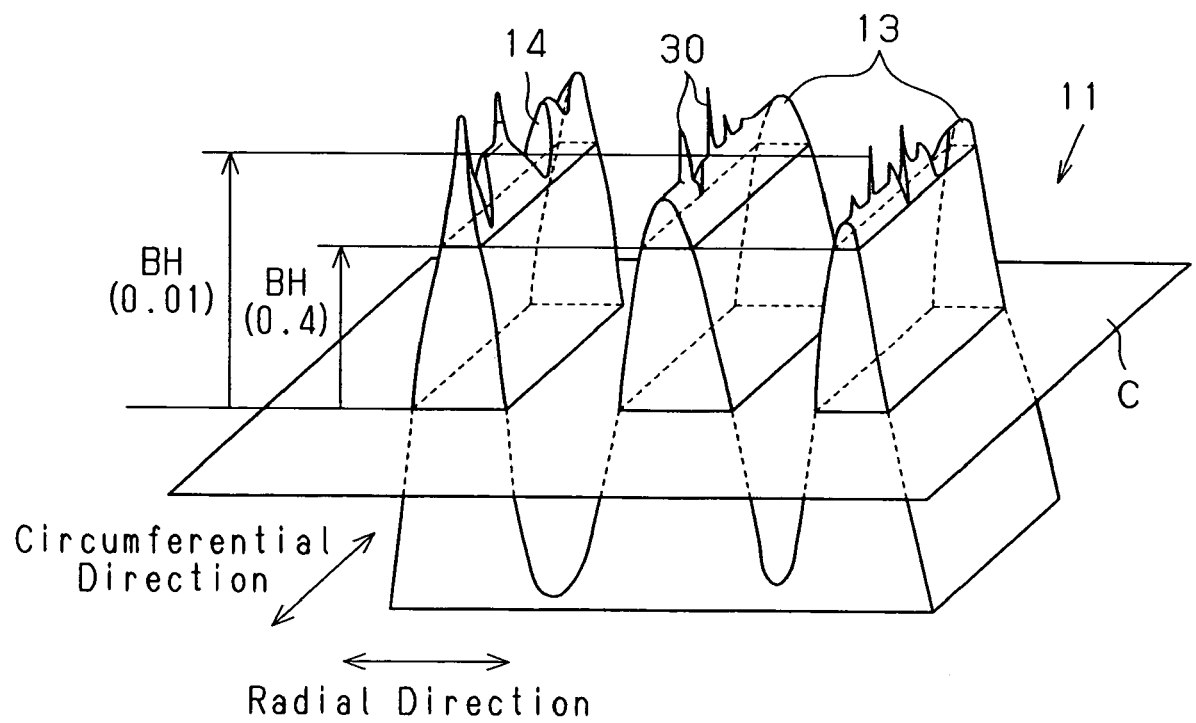
FIG. 9 is a schematic diagram showing bearing height with respect to a bearing ratio.

The bearing ratio and the bearing height will now be explained. FIG. 9 schematically shows the texture 13 in the same manner as FIG. 1. As shown in FIG. 9, the bearing ratio (BR) shows the percentage of the area of a cross-sectional plane of the textures 13 with respect to the entire area of the measurement range when the ridge shaped textures 13 are cut along the reference plane C parallel to the main surface 15 of the glass substrate 11 in a measurement range of the atomic force microscope that is 10 μm square.

If the height of the texture 13 when the bearing ratio BR is 50% is the reference height, the bearing height (BH) represents the height of the texture 13 from the reference height for every arbitrary BR. In FIG. 9, BH when BR is 0.01% is expressed as BH (0.01), and BH when BR is 0.4% is expressed as BH (0.4). Further, at parts where the BR of the texture 13 is small, a great number of projections, or burrs 30, having a relatively large projection amount are formed. The difference between BH (0.01) and BH (0.4) reflects the presence of burrs 30 and differences in the distal shapes of the textures 13. Further, the difference between BH (0.4) and BH (1.0) reflects the shape of the texture 13.

FIG. 10 is a graph showing the relationship between BR (%) and BH. The relationship shown by a solid line 35 is a case in which the state of the texture 13 is satisfactory. That is, since the textures 13 are formed with mountain shapes, the BR decreases towards the vertex, the height of the texture 13 increases, and the BH increases. The BR increases towards the valley base, and thus the height of the texture 13 decreases and the BH decreases. Therefore, by deriving the difference of BH relating to a plurality of different BRs, the distribution of the height of the textures 13 is obtained. Particularly, the difference of BH between two parts having small BR shows the state of the burrs 30. The relationship shown by a single-dot broken line 36 in FIG. 10 shows the state of textures 13 including large projecting ridges, and the relationship by a double-dot broken line 37 shows the state of textures 13 including burrs 30.

More specifically, the difference between BH when BR is 0.01% and BH when BR is 0.4% is preferably between 0.01 and 1.0 nm. If the difference is greater than 1.0 nm, the projections having a large projection amount relatively increase in the texture 13, the wear of the magnetic head increases, and satisfactory levitation characteristic becomes difficult to obtain. For example, in a continuous seek test conducted over 2000 hours or a fixed point levitation test conducted over 24 hours, crash of the magnetic head may occur. If the difference is smaller than 0.01 nm, on the other hand, the difference between both values is a value within the range of the measurement error.

In regards to the shape of the texture 13, the difference between BH when BR is 0.4% and BH when BR is 1.0% is preferably between 0.15 and 0.20 nm. By setting the difference of BH in such range, sticking of the magnetic head to the glass substrate is less likely to occur, and further, the coercive force of the lubrication film arranged on the outermost surface of the glass substrate increases, and a satisfactory levitation characteristic of the magnetic head is obtained. In this case, crash of the magnetic head does not occur in, for example, a continuous seek test conducted over 2000 hours and a fixed point levitation test conducted over 48 hours, and is thus preferable. If the difference in BH satisfies the above range, the strength of the texture 13 increases, a satisfactory levitation characteristic is obtained, and crash of the magnetic head does not occur in a fixed point levitation test conducted over 48 hours.

Preferably, the difference between BH when BR is 0.01% and BH when BR is 0.4% is between 0.2 and 0.7 nm, and the difference between BH when BR is 0.4% and BH when BR is 1.0% is between 0.17 and 0.20 nm. If the difference between BH when BR is 0.01% and BH when BR is 0.4% is between 0.2 and 0.7 nm, projections having a large projection amount relatively decrease in the texture 13 and the wear of the magnetic head is further decreased. This is preferable. If the difference between BH when BR is 0.4% and BH when BR is 1.0% is between 0.17 and 0.20 nm, a more satisfactory levitation characteristic is obtained and is thus preferable. That is, sticking of the magnetic head with respect to the glass substrate is less likely to occur, and the coercive force of the lubrication film arranged on the outermost surface of the glass substrate increases. In this case, crash of the magnetic head does not occur in, for example, a continuous seek test of 2000 hours and a fixed point levitation test conducted over 96 hours.

The difference between BH when BR is 0.4% and BH when BR is 1.0% is desirably set to be smaller than the difference between BH when BR is 1.0% and BH when BR is 15%. In this case, the obtained texture 13 has a uniform shape.

Figure 2:
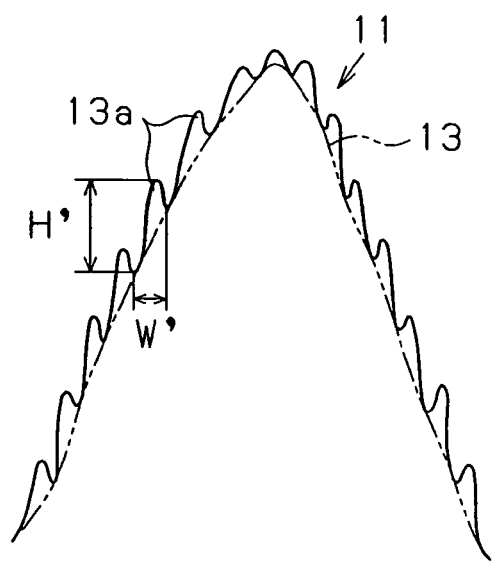
FIG. 2 is a schematic diagram showing high frequency components of the textures.

As shown in FIG. 2, the texture 13 is recognized to be configured from the above mentioned low frequency components and high frequency components, which are finer than the low frequency component, superimposed on the low frequency components, and obtained by measuring the range of 1 μm square or 0.1 μm square with a atomic force microscope. The width W' of the texture 13a of high frequency components refers to the distance between the bottoms of two adjacent textures 13a. Preferably, the width W' of the texture 13a of high frequency components is between 0.1 and 20 nm, and the height H' of the texture 13a of high frequency components is between 0.1 and 1 nm. By setting the width W' and the height H' of the texture 13a within such range, the magnetic anisotropy of the crystal of the magnetic film arranged on the surface of the glass substrate 11 increases, and the magnetic anisotropy value expressed as the above mentioned ratio (Hc1/Hc2) of the coercive force becomes greater than or equal to 1.1. In this case, the magnetic recording density at the slope of the ridge of the texture 13 of a low frequency component is increased. This is particularly effective in the magnetic recording medium of a vertical magnetic recording method.

When the width W' of the textures 13a of high frequency components is less than 0.1 nm or greater than 20 nm, the magnetic anisotropy value lowers to below 1.1, and the magnetic anisotropy is not sufficiently expressed. This is not preferable. When the height H' of the texture 13a of high frequency component is less than 0.1 nm or greater than 1 nm, the magnetic anisotropy value lowers to below 1.1, and the magnetic anisotropy is not sufficiently expressed. This is not preferable.

Preferably, the width W' of the texture 13a of a high frequency component is between 1 to 5 nm, and the height H' of the texture 13a of a high frequency component is between 0.3 to 0.8 nm. In this case, the magnetic anisotropy value is greater than or equal to 1.2, and the magnetic anisotropy is sufficiently expressed. This is considered to be because when the glass substrate 11 includes such a high frequency component texture 13a, the conditions are optimal for the crystal growth of the base film or the magnetic film formed on the glass substrate 11 through sputtering, thereby accelerating crystal orientation.

The maximum valley depth Rv of the texture 13 obtained by measuring the range of 10 μm square with the atomic force microscope is the depth from the reference plane C to the base of the deepest valley. The maximum valley depth Rv relates to local magnetic anisotropy, in which lowering of local magnetic anisotropy is prevented by decreasing the Rv. Since the magnetic anisotropy is expressed as the entire surface of the glass substrate 11, RV is preferably less than or equal to 10 nm. If the maximum valley depth Rv is greater than 10 nm, the local magnetic anisotropy value measured at the relevant location becomes lower than 1.1. This is not preferable since sufficient magnetic anisotropy is not exhibited. Further, when the magnetic film is arranged on the glass substrate surface formed with the textures 13, the crystal orientation is disturbed at portions where the grooves are deep. Thus, the magnetic property is lowered, and it becomes difficult for the magnetic head to read the signals of magnetic data. This is not preferable.

Figure 5:
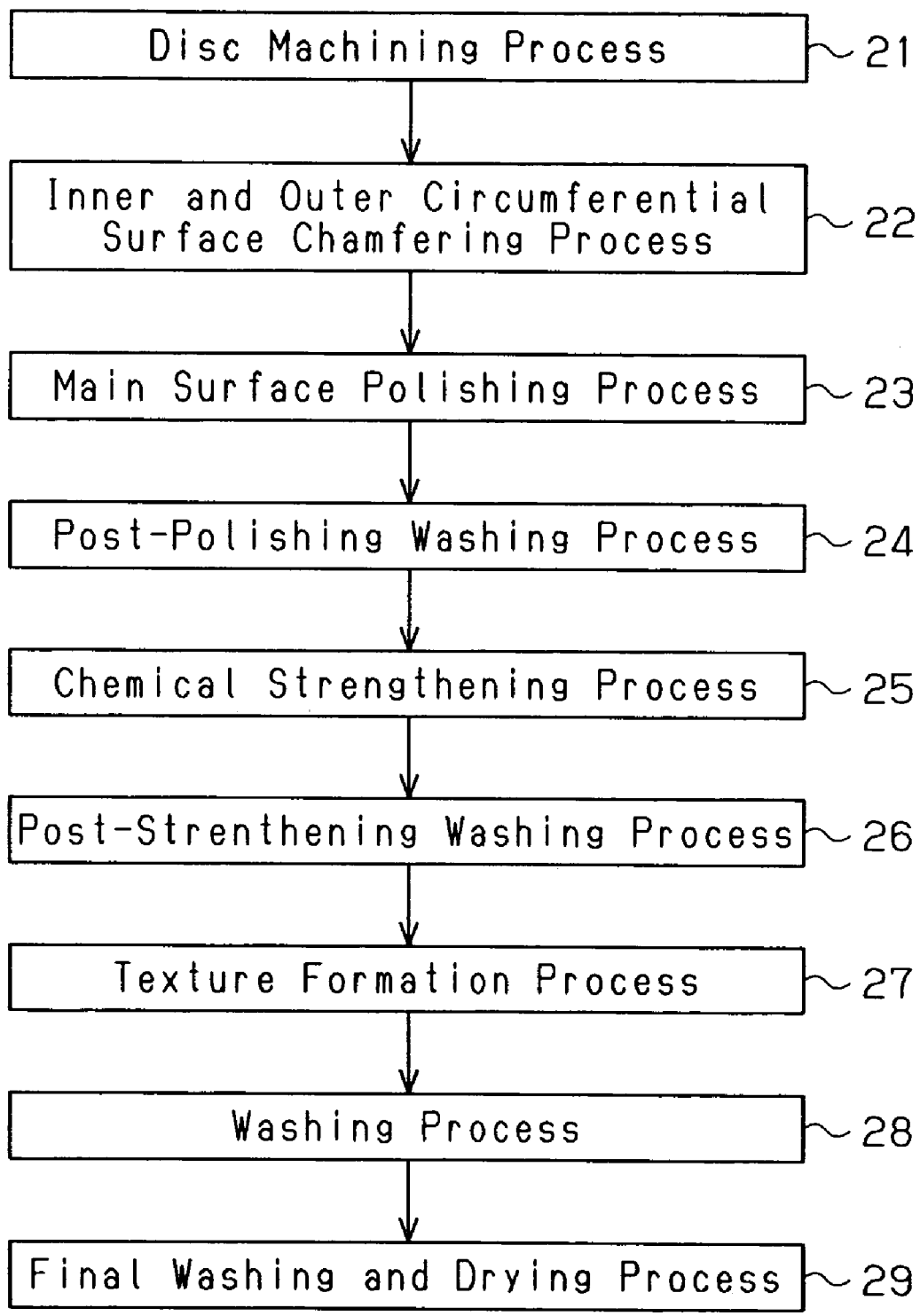
FIG. 5 is a process chart showing the manufacturing processes of the glass substrate for a magnetic recording medium.

A method for manufacturing the glass substrate for a magnetic recording medium described above will now be explained with reference to FIG. 5. As shown in FIG. 5, the glass substrate 11, which is used as a magnetic disc, is manufactured by undergoing a disc machining process 21, an inner and outer circumferential surface chamfering process 22, a main surface polishing process 23, a post-polishing washing process 24, a chemical strengthening process 25, a post-strengthening washing process 26, a texture formation process 27, a washing process 28, and a final washing and drying process 29.

A sheet of glass material for forming the glass substrate 11 is not particularly limited as long as it is a chemical strengthening glass fabricated by adding zirconium oxide ($ZrO_2$), titanium oxide ($TiO_2$), or the like to a glass material, such as soda lime glass of which main components are silicon dioxide ($SiO_2$), sodium oxide ($Na_2O$), and calcium oxide (CaO); an aluminosilicate glass of which main components are $SiO_2$, aluminum oxide ($Al_2O_3$), and $R_2O$ (R is potassium (K), sodium (Na), lithium (Li)); a borosilicate glass; lithium oxide ($Li_2O$)—$SiO_2$ glass; $Li_2O$—$Al_2O_3$—$SiO_2$ glass; R'O—$Al_2O_3$—$SiO_2$ glass [R' is magnesium (Mg), calcium (Ca), strontium (Sr) or barium (Ba)], etc. The glass substrate 11 is formed to have, for example, an outer diameter of 89 mm (3.5 inches), 76 mm (3.0 inches), or 64 mm (2.5 inches), and the thickness thereof is formed to be 0.63 mm.

In the disc machining process 21, a sheet of glass plate obtained through a float process is cut into a square shape, and is further cut into a disc shape using a cutter made of cemented carbide alloy or diamond to manufacture a glass substrate 11 with a central circular hole 12.

In the inner and outer circumferential surface chamfering process 22, the inner and outer circumferential surfaces of the glass substrate 11 are ground so that the outer diameter and the inner diameter of the glass substrate 11 have predetermined dimensions. Subsequently, the inner and outer circumferential surfaces are polished and chamfered with polishing slurry. In this process, a grindstone, to which abrasive grains such as diamond abrasive grains are adhered, is used.

Thereafter, in the main surface polishing process 23 of the glass substrate 11, the glass substrate 11, of which inner and outer circumferential edges have been chamfered, undergoes lap polishing and smooth polishing to polish the main surface 15 of the glass substrate 11. The lap polishing is performed so that glass substrate 11 has a thickness of a predetermined value and so that warps and undulations are removed to enhance planarity of the main surface 15 or eliminate large defects such as bumps or cracks to obtain a fine surface roughness. The lap polishing may be omitted to reduce cost if the warps and undulations formed during molding of the glass are within a permissible range.

The smooth polishing including a primary polishing and a secondary polishing is performed to obtain the flatness and smoothness required when using the glass substrate as the magnetic recording medium. The polishing agent used in this machining is not particularly limited, but is preferably a cerium oxide polishing agent that applies a high polishing force on the glass. The size of the polishing agent is not particularly limited, but normally, a size of about 0.1 to 3 μm is preferable to obtain both smoothness and polishing speed at a satisfactory level. The polishing method is also not particularly limited, but both surfaces are polished with high precision at a low cost by using two-surface polishing machine with an artificial leather suede pad attached to an upper polishing plate and a lower polishing plate.

The post-polishing washing process 24 is performed after the main surface polishing process 23 to remove the polishing grains remaining on the main surface 15 of the glass substrate 11. More specifically, washing by alkaline aqueous solution, washing by purified water, and drying by isopropyl alcohol (IPA) and the like are performed. In this case, acid treatment may be performed before washing with alkaline aqueous solution.

Next, in the chemical strengthening process 25, chemical strengthening is performed on the glass substrate 11, of which main surface 15 has undergone the polishing process, to enhance impact resistance, vibration resistance, and heat resistance etc. required for the substrate of the magnetic recording medium. The chemical strengthening process refers to ion conversion of some of the ions in the glass substrate 11, for example, monovalent metal ion such as lithium ion or sodium ion, to a monovalent metal ion such as sodium ion or potassium ion having a greater ion radius. A compression stress layer is formed on the surface of the glass substrate 11 from such ion conversion and the glass substrate 11 is chemically strengthened.

The thickness of the compression stress layer (chemical strengthening layer) formed by the chemical strengthening process preferably the same as the depth of between 100 to 200 μm from the surface of the glass substrate 11. If the thickness is less than 100 μm, the chemical strength of the glass substrate 11 is insufficient, and the performance required as the substrate for magnetic recording medium may not be exhibited. If the thickness is greater than 200 μm, the temperature of the chemical strengthening process liquid must be increased or the time for immersing the glass substrate 11 in the chemical strengthening process liquid must prolonged. This tends to lower the production efficiency of the glass substrate 11.

The strength of the entire glass substrate 11 is ensured when the chemical strengthening process is smoothly performed. Such ion conversion forms the compression stress layer on the main surface of the glass substrate 11 and increases the strength. This prevents breakage caused by high-speed rotation when the glass substrate 11 is used as the magnetic recording medium.

After the chemical strengthening process 25, the washing process 26 is performed. In the washing process 26, the chemically strengthened glass substrate 11 is washed with warm water to remove foreign materials such as chemical strengthening salt remaining on the surface of the glass substrate 11. As a result, in the texture formation, which will be described below, the main surface 15 of the glass substrate 11 is prevented from being scratched by foreign materials.

After the post-strengthening washing process 26, the texture formation process 27 is performed to form the textures 13 extending along the circumferential direction are formed on the main surface 15 of the glass substrate 11, as shown in FIG. 4. In order to have a satisfactory cleanness for the main surface 15 of the glass substrate 11 before texture formation, acid treatment or alkali treatment may be performed. The arithmetic mean roughness Ra obtained by measuring the main surface 15 of the glass substrate 11 subjected to the texture formation in a range of 10 μm square with the atomic force microscope is preferably between 0.1 and 1.5 nm, more preferably between 0.1 and 1.0 nm, and most preferably between 0.1 and 0.6 nm. The arithmetic mean roughness Ra is a parameter defined in JIS B 0601. When the arithmetic mean roughness Ra is less than 0.1 nm or greater than 1.5 nm, the microscopic textures 13 suitable for the magnetic recording medium become difficult to form.

When forming the textures 13 with diamond slurry, shallow streaks of grooves having the same depth are preferably evenly formed on the entire main surface 15 of the glass substrate 11 to form even textures 13 having a uniform shape. To do so, the diamond slurry is required to effectively cut into the main surface 15 without slipping on the main surface 15 immediately after the start of the texture formation. In order to satisfy such requirement, if the arithmetic mean roughness Ra of the main surface 15 of the glass substrate 11 before the texture formation is between 0.35 and 1.0 nm, it is preferable that the shallow streak of grooves are formed at substantially the same depth evenly on the entire surface of the main surface 15. If Ra is less than 0.35 nm, a difference in the ground amount between portions where slipping of the diamond slurry occurs and portions where slipping does not occur is likely to be produced. This may cause differences in the shape of textures. If Ra is greater than 1.0 nm, deep grooves are likely to form and the history before texture formation of the main surface 15 may remain. This is not preferable.

If the arithmetic mean roughness Ra of the main surface 15 before the texture formation is between 0.35 and 1.0 nm, precise polishing of the main surface 15 in unnecessary. Further, the texture formation is performed in a short period of time, and the manufacturing of the glass substrate for magnetic recording medium is facilitated.

The texture formation is performed by slidably contacting a tape member to the main surface 15 of the glass substrate while dropping the diamond slurry on the main surface 15 of the glass substrate 11. The device for performing the texture formation is not particularly limited, and a so-called texture machine is used. The structure of the device will be described with reference to FIG. 3. A roller 16 extending in the radial direction of the glass substrate 11 is rotably supported immediately above the disc-shaped glass substrate 11. The length of the roller 16 is set so as to be substantially equal to the radius of the glass substrate 11.

A tape member 17 for texture formation is formed so that is passes from one side of the roller 16, into the space between the glass substrate 11 and the roller 16, and out of the other side of the roller 16 as shown by an arrow in FIG. 3. The tape member 17 is pressed against the main surface 15 of the glass substrate 11 by the pressure of the roller 16 when passing between the glass substrate 11 and the roller 16. A tape-shaped woven cloth, non-woven cloth, flocked article, and the like may be used as the tape member 17.

The glass substrate 11 is then rotated in the direction of the arrow in FIG. 3, and the diamond slurry 18 serving as a polishing slurry is dropped from above as the tape member 17 moves in the direction of the arrow of FIG. 3. Through such operation, the ridge shaped textures 13 extending along concentric circles are formed on the main surface 15 of the glass substrate 11.

The material of the tape member 17 is not particularly limited, and any material, such as woven cloth or non-woven cloth of fabrics, such as polyester or nylon, may be used as long it may form the above type of textures 13.

The grain diameter and the shape of the diamond abrasive grains contained in the diamond slurry 18 are not particularly limited, and are appropriately selected in accordance with the required line density and the like of the textures 13. Further, abrasive grains of cerium oxide or manganese oxide may be added or an alkaline agent may be added in addition to diamonds to increase the grinding force.

The grain diameter of the diamond abrasive grain preferably has a average grain diameter ($D_{50}$) of between 0.05 and 0.5 μm. If the average grain diameter is less than 0.05 μm, the capability of forming the texture 13 lowers, the formation speed of the texture 13 becomes slower, and the texture formation cost increases. This is not preferable. When exceeding 0.5 μm, a great number of small ridges cannot be formed per unit length in the radial direction of the glass substrate 11, and the line density of the texture 13 cannot be sufficiently increased.

A solvent for dispersing diamond abrasive grains to form the slurry is not particularly limited, and a surface active agent may be added to enhance the dispersibility of the diamond abrasive grain.

Specific formation conditions of the texture 13 are set as described below, for example, in accordance with the shape, the density and the length of the targeting texture 13.

The average grain diameter of the diamond abrasive grain: 0.1 to 0.5(μm); rotation speed of the glass substrate 11: 200 to 300(rpm); pressing force of the roller 16: 30 to 40 (N); material of the tape member 17: woven cloth or non-woven cloth.

In the texture formation process 27, the ridges and grooves are formed by physically scraping the main surface 15 of the glass substrate 11 in one direction with the diamond slurry 18. The main surface 15 of the glass substrate 11 scraped with the diamond slurry 18 has low elasticity and viscosity and high rigidity. Thus, microscopic cracks or chipping may be produced. When the textures 13 are formed by scraping the main surface 15 of the glass substrate 11 with the diamond slurry 18 while producing cracks and chipping, burrs 30 projected further outward from the ridge of a texture 13 may be formed.

When examining the step of forming the textures 13 with the diamond slurry 18 in further detail, a step for forming shallow grooves in the main surface 15 with the diamond slurry 18 and a step for scraping such grooves deeper are included. For example, when stopping the formation in a short period of time at an initial stage of the texture formation process 27 and observing the main surface 15, shallow streaks of grooves are formed. The shallow streaks of grooves function as guides when the diamond slurry 18 move while scraping the glass and also functions to facilitate the diamond slurry 18 cutting into the glass.

In the washing process 28 performed after the texture formation process 27, washing is performed with water using a scrub member made of polyurethane and the like. In this case, alkaline aqueous solution of pH8 to 12 may be used or ultrasonic wave way be irradiated. In this washing process 28, the foreign materials of the diamond slurry 18 and the burrs 30 remaining on the surface of the glass substrate 11 in the texture formation process 27 are removed.

The method for washing using the scrub member is not particularly limited, but may be roll brush washing, scrub washing for scrubbing along the circumferential direction as with tape washing, or scrub washing for scrubbing along a direction intersecting the circumferential direction using a cup brush. Among these washing methods, the scrub washing using the cup brush is more preferable since burrs are effectively removed from the textures 13. In the washing process 28, the foreign materials of the diamond slurry 18 and the like and the burrs 30 of the textures 13 remaining on the main surface 15 in the texture formation process 27 are removed.

Between the texture formation process 27 and the washing process 28, a washing step for roughly washing off the diamond slurry 18, for example, ultrasonic wave washing, tape washing, or scrub washing using at least one of a neutral aqueous solution and an alkaline aqueous solution of pH 8 to 12 is preferably performed. This is because when using the scrub member, which is made of hard polyurethane, the shape of the texture 13 is prevented from changing due to the residual diamond grains.

After the washing process 28, the final washing and drying process 29 is performed. In this step, after washing with alkaline aqueous solution and washing with purified water, the drying process is performed with a solvent such as isopropyl alcohol (IPA).

The glass substrate 11 for a magnetic recording medium of the present embodiment is manufactured through each of the above manufacturing processes. The textures 13 of low frequency components are formed on the surface of the obtained glass substrate 11. Further, the width W and the height H of the texture 13, and the ratio (Rp/RMS) of the maximum mountain height Rp with respect to the root mean square roughness RMS of the texture 13 are set within a predetermined range. That is, the shape, the density, and abnormal projection etc. of the texture 13 are optimized for low levitation amount and levitation stability of the magnetic head.

Therefore, the magnetic head levitates in a state close to the surface of the glass substrate 11 during the rotation operation while stably moving.

The above embodiment has the advantages described below.

In the glass substrate 11 for a magnetic recording medium of the present embodiment, the width W of the textures 13 of low frequency components is between 10 and 200 nm, the height H of the textures 13 is between 2 and 10 nm, and the ratio (Rp/RMS) of the maximum mountain height Rp with respect to the root mean square RMS of the textures 13 is less than or equal to 15. Thus, the shape and density of the texture 13 are appropriate, the formation of abnormal projections is suppressed, the levitation amount of the magnetic head is further lowered, and the levitation stability is further enhanced.

The width W of the texture 13 is set to be between 10 and 20 nm. The average depth D of the depression 14 of the texture 13 is set to be less than or equal to 2 nm, and the ratio H/D of the height H of the texture 13 with respect to the average depth D is set be to greater than or equal to 10. Thus, low levitation amount and levitation stability of the magnetic head are further enhanced.

The textures 13a of high frequency components are superimposed and formed on the textures 13 of low frequency components, in which the width W' of the texture 13a of high frequency components is set to be between 0.1 and 20 nm, and the height H' of the textures 13a of high frequency components is set to be between 0.1 and 1 nm. Thus, in addition to the shape of the textures 13 of low frequency components, the shape of the texture 13a of high frequency components is becomes appropriate, the magnetic anisotropy is enhanced, the magnetic recording density at the texture 13 is further enhanced.

The maximum valley depth Rv of the textures 13 is set to be less than or equal to 10 nm. This prevents the local magnetic anisotropy from being lowered at deep valleys of the textures 13.

If the arithmetic mean roughness Ra of the main surface 15 of the glass substrate 11 before texture formation is between 0.35 and 1.0 nm, shallow streaks of grooves are evenly formed with substantially the same depth on the entire surface of the main surface 15, and even textures 13 having uniform shape are formed.

EXAMPLES

Examples embodying the above embodiment will now be described.

Example 1

A sheet of glass substrate 11 formed from aluminosilicate glass (63 mol % of $SiO_2$, 16 mol % of $Al_2O_3$, 11 mol % of $Na_2O$, 4 mol % of $LiO_2$, 2 mol % of MgO, 4 mol % of CaO) is obtained through the float process. The glass substrate 11 was machined into a disc shape with a thickness of 1.0 mm, an outer diameter of 65 mm, and an inner diameter of 20 mm using a diamond cutter in the disc machining process 21.

Subsequently, in the inner and outer circumferential surface chamfering process 22, the inner and outer circumferential surface chamfering was performed on the glass substrate 11. In the main surface polishing process 23, lap polishing and smoothing were performed on the main surface 15 of the glass substrate 11. The smooth polishing was performed by polishing both surfaces of the glass substrate 11 using the polishing agent containing cerium oxide and a polishing pad having an Asker C hardness of 70.

In the post-polishing washing process 24, after removing the polishing grains attached to the surface of the glass substrate 11 through sponge washing using polyvinyl alcohol and ultrasonic wave washing with an alkaline aqueous solution, the glass substrate 11 was rinsed with purified water. The glass substrate 11 was then dried for one minute with an isopropyl alcohol vapor.

In the chemical strengthening process 25, the glass substrate 11 was immersed for 90 minutes in a mixed molten salt of potassium nitrate and sodium nitrate heated to 350 to 400° C. to perform chemical strengthening process for converting lithium ions and sodium ions in the glass substrate 11 to potassium ions having greater ion radiuses.

In the post-strengthening washing process 26, the chemically strengthened glass substrate 11 was immersed in water and the molten salt was removed.

In the texture formation process 27, the diamond slurry was dropped while rotating the glass substrate 11 using the texture machine to perform texture formation on the main surface 15 of the glass substrate under the following conditions.

Grain diameter of the diamond abrasive grain: 0.2(μm), rotation speed of the glass substrate 11: 300(rpm), pressing force of the roller 16: 30(N), material of the tape member 17: woven cloth, hardness of the roller 16: 50 (duro).

In the washing process 28 after the texture formation, alkaline aqueous solution washing was performed under a pressure of $1 \times 10^{-3}$ Pa with a polyurethane scrub member using the potassium hydroxide aqueous solution (pH11). Subsequently, in the final washing and drying process 29, washing with purified water and drying with isopropyl alcohol (IPA) were performed. The above manufacturing conditions are summarized in table 1.

TABLE 1

| | Post-Strengthening Washing Process | Texture Formation Process | | | | Washing Process | |
|---|---|---|---|---|---|---|---|
| | | Grain Diameter of Diamond Slurry (μm) | Rotation Number (rpm) | Pressing Load (N) | Type of Polishing Tape | Time (sec.) | pH |
| Ex. 1 | No | 0.1 | 200 | 30 | Woven Cloth | 10 | 11 |
| Ex. 2 | No | 0.2 | 300 | 40 | Woven Cloth | 15 | 11 |
| Ex. 3 | No | 0.2 | 300 | 30 | Woven Cloth | 10 | 11 |
| Ex. 4 | Sulfuric acid treatment at 0.1% wt | 0.2 | 300 | 30 | Woven Cloth | 5 | 11 |
| Ex. 5 | No | 0.3 | 300 | 30 | Woven Cloth | 10 | 11 |
| Ex. 6 | No | 0.5 | 200 | 30 | Woven Cloth | 5 | 12 |
| Comp. Ex. 1 | No | 0.5 | 200 | 40 | Non-Woven Cloth | 5 | 11 |
| Comp. Ex. 2 | No | 0.5 | 300 | 30 | Woven Cloth | 5 | 11 |
| Comp. Ex. 3 | No | 0.1 | 300 | 30 | Woven Cloth | 10 | 11 |
| Comp. Ex. 4 | No | 0.1 | 300 | 30 | Non-woven Cloth | 10 | 11 |
| Comp. Ex. 5 | No | 0.1 | 300 | 40 | Non-Woven Cloth | 5 | 11 |
| Comp. Ex. 6 | No | 0.5 | 200 | 30 | Woven Cloth | None | 11 |
| Ex. 7 | No | 0.1 | 200 | 30 | Woven Cloth | 10 | 11 |
| Ex. 8 | No | 0.3 | 300 | 30 | Non-Woven Cloth | 10 | 11 |
| Ex. 9 | HF treatment at 2 ppm | 0.5 | 200 | 30 | Woven Cloth | 5 | 12 |

TABLE 1-continued

| | Post-Strengthening Washing Process | Texture Formation Process | | | | Washing Process | |
|---|---|---|---|---|---|---|---|
| | | Grain Diameter of Diamond Slurry (μm) | Rotation Number (rpm) | Pressing Load (N) | Type of Polishing Tape | Time (sec.) | pH |
| Ex. 10 | Sulfuric acid treatment at 0.1% wt | 0.5 | 200 | 30 | Woven Cloth | 5 | 12 |
| Ex. 11 | No | 0.1 | 200 | 30 | Woven Cloth | 10 | 10 |
| Ex. 12 | No | 0.2 | 300 | 40 | Woven Cloth | 15 | 9.5 |
| Ex. 13 | No | 0.3 | 300 | 30 | Non-Woven cloth | 10 | 9.5 |
| Ex. 14 | No | 0.3 | 300 | 30 | Non-Woven cloth | 10 | 10.5 |
| Ex. 15 | No | 0.5 | 200 | 30 | Woven Cloth | 5 | 10 |
| Ex. 16 | No | 0.5 | 200 | 30 | Woven Cloth | 5 | 11.5 |
| Ex. 17 | Sulfuric acid treatment at 0.5% wt | 0.2 | 300 | 40 | Woven Cloth | 15 | 9.5 |
| Ex. 18 | Sulfuric acid treatment at 0.05% wt | 0.1 | 200 | 30 | Woven Cloth | 10 | 10 |
| Ex. 19 | Sulfuric acid treatment at 0.1% wt | 0.5 | 200 | 30 | Woven Cloth | 5 | 10 |
| Ex. 20 | No | 0.3 | 300 | 30 | Non-Woven Cloth | 10 | 11 |
| Ex. 21 | No | 0.3 | 300 | 50 | Non-Woven Cloth | 10 | 11 |
| Ex. 22 | No | 0.5 | 200 | 30 | Woven Cloth | 5 | 11 |
| Ex. 23 | No | 0.5 | 200 | 50 | Woven Cloth | 5 | 11 |

The range of 10 μm square was measured using an AFM manufactured by Veeco Instruments Inc. for the obtained glass substrate 11, and the width W of the texture 13 was 10 nm, the height H was 2 nm, and the ratio (Rp/RMS) of the maximum mountain height Rp and the root mean square roughness RMS of the texture 13 was 1.5. A continuous seek test and a fixed point levitation test were conducted in the following way on the glass substrate 11 as a drive test. The results are shown in table 2.

Continuous seek test: presence of crash of magnetic head in the drive test conducted 2000 hours was measured.

Fixed point levitation test: presence of head crash in the levitation test (24 hours, 48 hours, 72 hours, 96 hours) of the magnetic head at a fixed point above the magnetic head under a decompressed pressure (26.7 kPa) was measured.

Comparative Examples 1 to 6

The manufacturing conditions of the glass substrate 11 were changed as shown in table 1. Further, a glass substrate having a width W and height H of the texture 13 and a ratio (Rp/RMS) of the maximum mountain height Rp and the root mean square roughness RMS for the texture 13 that are the same as in example 1 was obtained. The continuous seek test and the fixed point levitation test were conducted on the glass substrate in the same manner as in example 1. The results are shown in table 2.

Examples 2 to 6

The manufacturing conditions of the glass substrate 11 were changed as shown in table 1, and a glass substrate having a width W and height H for the texture 13 and a ratio (Rp/RMS) of the maximum mountain height Rp and the root mean square roughness RMS for the texture 13 that are the same as in example 1 was obtained. The continuous seek test and the fixed point levitation test were conducted on the glass substrate in the same manner as in example 1. The results are shown in table 2.

TABLE 2

| | | | | Drive test | | | | |
|---|---|---|---|---|---|---|---|---|
| | | | | Continuous Seek | Fixed Point Levitation | | | |
| | W(nm) | H(nm) | Rp/RMS | 2000 hr | 24 hr | 48 hr | 72 hr | 96 hr |
| Ex. 1 | 10 | 2 | 1.5 | No | No | No | No | No |
| Ex. 2 | 16 | 3 | 2 | No | No | No | No | No |
| Ex. 3 | 20 | 5 | 3 | No | No | No | No | No |
| Ex. 4 | 20 | 6 | 4 | No | No | No | No | Yes |
| Ex. 5 | 50 | 5 | 8 | No | No | No | Yes | |
| Ex. 6 | 200 | 10 | 15 | No | No | No | Yes | |
| Comp. Ex. 1 | 250 | 8 | 9 | Yes | Yes | | | |
| Comp. Ex. 2 | 300 | 8 | 8 | Yes | Yes | | | |
| Comp. Ex. 3 | 7 | 3 | 3 | Yes | Yes | | | |
| Comp. Ex. 4 | 6 | 1.5 | 2 | Yes | Yes | | | |

TABLE 2-continued

| | | | | Drive test | | | | |
|---|---|---|---|---|---|---|---|---|
| | | | | | Contin-uous Seek | Fixed Point Levitation | | |
| | W(nm) | H(nm) | Rp/RMS | 2000 hr | 24 hr | 48 hr | 72 hr | 96 hr |
| Comp. Ex. 5 | 160 | 1.5 | 11 | Yes | Yes | | | |
| Comp. Ex. 6 | 200 | 10 | 18 | Yes | Yes | | | |

As shown in table 2, in examples 1 to 3, the width W of the texture 13 was within the range of 10 to 20 nm, the height H of the texture 13 was within the range of 2 to 5 nm, and the ratio (Rp/RMS) was less than or equal to 3, and crash of the magnetic head did not occur in the continuous seek test and the fixed point levitation test conducted over 96 hours. In example 4, the width W of the texture 13 was within the range of 10 to 20 nm, the height H of the texture 13 was within the range of 2 to 10 nm, and the ratio (Rp/RMS) was less than or equal to 5, and crash of the magnetic head did not occur in the continuous seek test and the fixed point levitation test conducted over 72 hours. Further, in examples 5 and 6, the width W of the texture was greater than 20 nm, and although inferior to examples 1 to 3 in the fixed point levitation test, crash of the magnetic head did not occur for as long as 48 hours.

In comparative examples 1 and 2, on the other hand, the width W of the texture was greater than 200 nm, and crash of the magnetic head did occur in the continuous seek test and the fixed point levitation test conducted over 24 hours. In comparative example 3, the width W of the texture was below 10 nm, and crash of the magnetic head did occur in the continuous seek test and the fixed point levitation test conducted over 24 hours. In comparative examples 4 and 5, the height H of the texture was less than 2 nm or greater than 10 nm, and crash of the magnetic head did occur in the continuous seek test and the fixed point levitation test conducted over 24 hours. In comparative example 6, the ratio (Rp/RMS) was greater than 15, and crash of the magnetic head occurred in the continuous seek test and the fixed point levitation test conducted over 24 hours.

Examples 7 to 10

The manufacturing conditions of the glass substrate 11 were changed as shown in table 1, and a glass substrate having an average depth D of the depression 14 and a ratio H/D of the height H with respect to the average depth D of the texture 13 shown in table 3 was obtained in the same manner as in example 1. A continuous seek test and a fixed point levitation test were carried out on the obtained glass substrate 11 in the same manner as in example 1. The results are shown in table 3.

TABLE 3

| | | | Drive Test | | | |
|---|---|---|---|---|---|---|
| | | | Continuous Seek | Fixed Point Levitation | | |
| | D(nm) | H/D | 2000 hr | 24 hr | 48 hr | 72 hr |
| Example 7 | 0.1 | 15 | No | No | No | No |
| Example 8 | 2 | 20 | No | No | No | No |
| Example 9 | 2.5 | 16 | No | No | Yes | |
| Example 10 | 1.5 | 9 | No | No | Yes | |

As shown in table 3, in examples 7 and 8, the average depth D of the depression 14 was less than or equal to 2 nm, the ratio H/D was greater than or equal to 10, and crash of the magnetic head did not occur in the continuous seek test and the fixed point levitation test conducted over 72 hours. In example 9, the average depth was greater than 2 nm, and in example 10, the ratio H/D was less than 10, and although inferior to examples 7 and 8 in the fixed point levitation test, crash of the magnetic head did not occur for up to 24 hours.

Examples 11 to 19

The manufacturing conditions of the glass substrate 11 were changed as shown in table 1, and a glass substrate 11 having a width W' and a height H' of the textures of high frequency components as shown in table 4 was obtained in the same manner as in example 1. The magnetic anisotropy value was measured for such glass substrate 11. The results are shown in table 4.

TABLE 4

| | | | | Drive Test | |
|---|---|---|---|---|---|
| | W' (nm) | H' (nm) | OR | Continuous Seek 2000 hr | Fixed Point Levitation 24 hr |
| Example 11 | 0.1 | 0.1 | 1.19 | No | No |
| Example 12 | 1 | 0.3 | 1.28 | No | No |
| Example 13 | 5 | 0.8 | 1.25 | No | No |
| Example 14 | 14 | 1 | 1.18 | No | No |
| Example 15 | 20 | 1 | 1.15 | No | No |
| Example 16 | 23 | 0.9 | 1.09 | No | No |
| Example 17 | 0.05 | 0.1 | 1.07 | No | No |
| Example 18 | 0.1 | 0.05 | 1.03 | No | No |
| Example 19 | 18 | 1.2 | 1.05 | No | No |

As shown in table 4, in examples 11 to 15, the width W' of the textures of high frequency components was within the range of 0.1 to 20 nm, the height H' of the texture of high frequency components was within the range of 0.1 and 1 nm, and the magnetic anisotropy was greater than or equal to 1.15 and thus had sufficient magnetic anisotropy. In examples 16 and 17, the width W' of the texture of high frequency components was either greater than 20 nm or less than 0.1 nm, the magnetic anisotropy value was between 1.07 and 1.09, and the magnetic anisotropy was lower. In examples 18 and 19, the height H' of the texture of high frequency components was less than 0.1 or greater than 1 nm, and the magnetic anisotropy was between 1.03 and 1.05, and the magnetic anisotropy was lower.

Examples 20 to 23

The manufacturing conditions of the glass substrate 11 were changed as shown in table 1, and the glass substrate having a maximum valley depth Rv for the texture as shown in table 5 was obtained in the same manner as in example 1. The magnetic anisotropy value was measured for the obtained glass substrate 11. The results are shown in table 4.

TABLE 5

| | | | Drive Test | |
|---|---|---|---|---|
| | Rv (nm) | OR | Continuous Seek 2000 hr | Fixed Point Levitation 24 hr |
| Example 20 | 2 | 1.23 | No | No |
| Example 21 | 5 | 1.21 | No | No |

TABLE 5-continued

|  | Rv (nm) | OR | Drive Test | |
|---|---|---|---|---|
|  |  |  | Continuous Seek 2000 hr | Fixed Point Levitation 24 hr |
| Example 22 | 10 | 1.08 | No | No |
| Example 23 | 15 | 1.05 | No | No |

As shown in table 5, in examples 20 and 21, the maximum valley depth Rv was less than or equal to 5 nm, and the magnetic anisotropy value was between 1.21 and 1.23. Thus, the magnetic anisotropy was high. In comparison, in examples 22 and 23, the maximum valley depth Rv was between 10 and 15 nm, and the magnetic anisotropy value decreased to between 1.05 and 1.08. Thus, the magnetic anisotropy was lowered.

Application Examples 1 to 4

Figure 6:
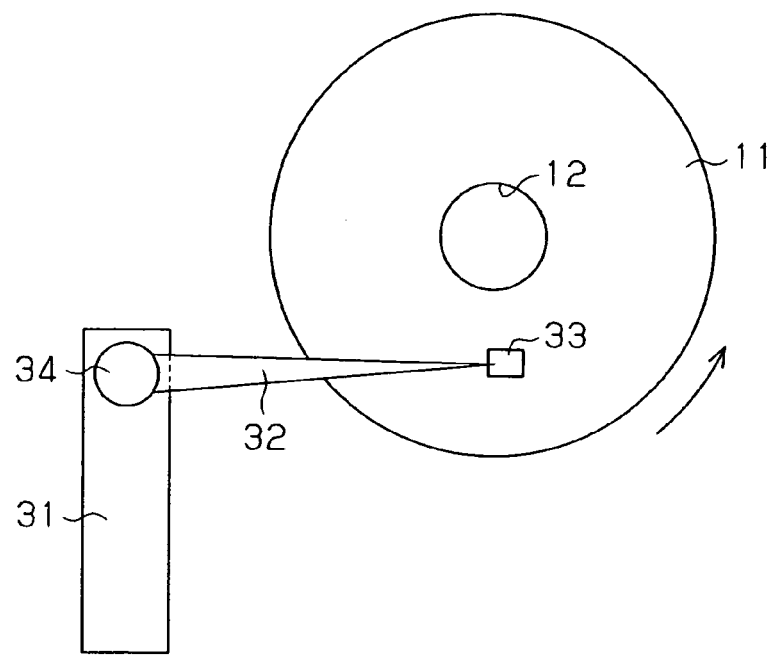
FIG. 6 is a schematic plan view showing a device that performs a fixed point levitation test.

Using the samples of comparative example 1, comparative example 5, example 2, and comparative example 4, the atmospheric pressure was set to normal pressure or a reduced pressure as shown in table 6, and the force in the tangential direction of the glass substrate received by the magnetic head was measured under such condition. The measuring process will now be described. As shown in FIG. 6, the magnetic head 33 supported by a support 32 extending from a supporting device body 31 was arranged at a position above a fixed point of the glass substrate 11 rotating at 3000 rpm. A strain gauge sensor 34 was arranged at a basal end of the support 32, and the force in the tangential direction received by the magnetic head 33 was measured by the strain gauge sensor 34. The force was expressed as the voltage value (mV). The results are shown in table 6 and FIG. 7.

TABLE 6

|  | Sample | Atmospheric Pressure (kPa) | | | | | | W (nm) | H (nm) |
|---|---|---|---|---|---|---|---|---|---|
|  |  | 101.5 | 80.1 | 66.8 | 53.4 | 40.1 | 26.7 |  |  |
| App. Ex. 1 | Comp. Ex. 1 | −33.0 | −32.0 | −33.4 | −40.1 | −72.0 | −19.7 | 250 | 8 |
| App. Ex. 2 | Comp. Ex. 5 | −28.0 | −29.7 | −64.6 | −109.2 | −16.8 | −14.1 | 160 | 1.5 |
| App. Ex. 3 | Ex. 2 | −35.5 | −34.0 | −37.2 | −36.5 | −34.8 | −31.4 | 16 | 3 |
| App. Ex. 4 | Comp. Ex. 4 | −32.1 | −33.0 | −39.9 | −62.6 | −99.8 | −22.5 | 6 | 1.5 |

Figure 7:
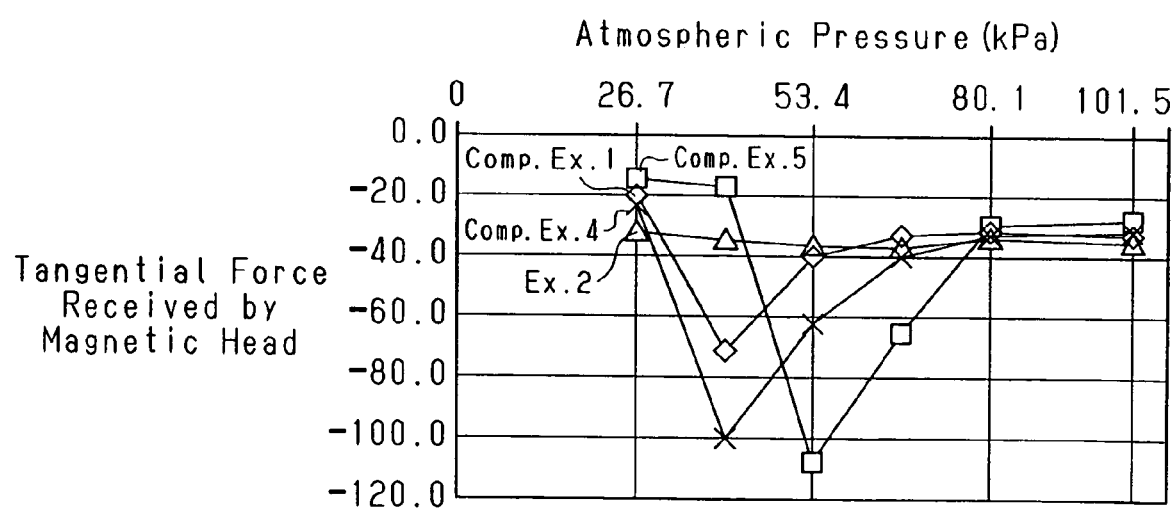
FIG. 7 is a graph showing the relationship between atmospheric pressure and tangential force, which is received by the magnetic head.

As shown in table 6 and FIG. 7, in application example 3, when the sample of example 2 was used, the force in the tangential direction received by the magnetic head 33 barely changed even when the atmospheric pressure was decreased. In comparison, when samples of comparative example 1, comparative example 5, and comparative example 4 were used, the force in the tangential direction received by the magnetic head 33 increased as the atmospheric pressure decreased to between 40.1 and 80.1 (kPa). Thus, it is apparent that the magnetic head 33 will contact the textures 13 of the surface of the glass substrate 11.

Examples 24 to 34

The conditions of the chemical strengthening process, the texture formation process, and the washing process were changed as shown in table 7, and the glass substrate 11 having the properties of the textures shown in table 7 was obtained in the same manner as in example 1. A continuous seek test and a fixed point levitation test were performed on the obtained glass substrate 11 in the same manner as in example 1. The results are shown in table 8.

TABLE 7

|  |  | Surface Roughness Ra (nm) of Glass Substrate Before Texture Formation Process | Texture Formation Process | | | | Washing Process | |  |
|---|---|---|---|---|---|---|---|---|---|
|  | Chem. Strengthening Process |  | Grain Diameter of Diamond Slurry (μm) | Rotating Number (rpm) | Pressing Load (N) | Type of Polishing Tape | Time of PU Scrub (sec) | pH |
| Ex. 24 | Yes | 0.20 | 0.2 | 300 | 30 | Woven Cloth | 3 | 12 |

TABLE 7-continued

|  | Chem. Strengthening Process | Surface Roughness Ra (nm) of Glass Substrate Before Texture Formation Process | Texture Formation Process | | | | Washing Process | |
|---|---|---|---|---|---|---|---|---|
|  |  |  | Grain Diameter of Diamond Slurry (μm) | Rotating Number (rpm) | Pressing Load (N) | Type of Polishing Tape | Time of PU Scrub (sec) | pH |
| Ex. 25 | Yes | 0.36 | 0.2 | 300 | 30 | Woven Cloth | 3 | 11.5 |
| Ex. 26 | Yes | 0.50 | 0.2 | 300 | 30 | Woven Cloth | 3 | 11 |
| Ex. 27 | Yes | 0.59 | 0.2 | 300 | 30 | Woven Cloth | 3 | 10 |
| Ex. 28 | No | 0.72 | 0.2 | 300 | 30 | Woven Cloth | 3 | 11 |
| Ex. 29 | Yes | 0.98 | 0.2 | 300 | 30 | Woven Cloth | 3 | 11 |
| Ex. 30 | Yes | 1.12 | 0.2 | 300 | 30 | Woven Cloth | 2 | 11 |
| Ex. 31 | Yes | 0.59 | 0.2 | 300 | 30 | Woven Cloth | 0.5 | 9 |
| Ex. 32 | Yes | 0.80 | 0.1 | 300 | 40 | Woven Cloth | 1 | 9.5 |
| Ex. 33 | Yes | 0.63 | 0.1 | 300 | 40 | Woven Cloth | 1 | 9 |
| Ex. 34 | Yes | 0.15 | 0.5 | 300 | 30 | Woven Cloth | 3 | 11 |

TABLE 8

|  | Circumferential Texture Shape | | | Drive Test | | | | |
|---|---|---|---|---|---|---|---|---|
|  | BH (0.01)-BH (0.4) (nm) | BH (0.4)-BH (1.0) (nm) | [BH (0.4)-BH (1.0)]-[BH (1.0)-BH (15)] (nm) | Continuous Seek 2000 hr | Fixed Point Levitation | | | |
|  |  |  |  |  | 24 hr | 48 hr | 72 hr | 96 hr |
| Ex. 24 | 0.18 | 0.15 | Negative | No | No | No | Yes | Yes |
| Ex. 25 | 0.39 | 0.17 | Negative | No | No | No | No | Yes |
| Ex. 26 | 0.45 | 0.18 | Negative | No | No | No | No | No |
| Ex. 27 | 0.38 | 0.17 | Negative | No | No | No | No | No |
| Ex. 28 | 0.41 | 0.18 | Negative | No | No | No | No | No |
| Ex. 29 | 0.42 | 0.16 | Negative | No | No | No | No | Yes |
| Ex. 30 | 0.44 | 0.16 | Negative | No | No | No | Yes | Yes |
| Ex. 31 | 0.68 | 0.19 | Negative | No | No | No | Yes | Yes |
| Ex. 32 | 0.72 | 0.19 | Negative | No | No | Yes | Yes | Yes |
| Ex. 33 | 0.93 | 0.2 | Negative | No | No | Yes | Yes | Yes |
| Ex. 34 | 0.63 | 0.62 | Positive | No | Yes | Yes | Yes | Yes |

As shown in table 8, in each of examples 24 to 34, the crash of the magnetic head did not occur in the continuous test. Further, in examples 26 to 28, crash of the magnetic head did not occur in the fixed point levitation test conducted over 96 hours. In examples 25 and 29, crash of the magnetic head did not occur in the fixed point levitation test conducted over 72 hours. In examples 24, 30 and 31, crash of the magnetic head did not occur in the fixed point levitation test conducted over 48 hours. In examples 32 and 33, crash of the magnetic head did not occur in the fixed point levitation test conducted over 24 hours.

The above embodiment and examples may be modified as described below.

The texture may be such that it satisfies one of the conditions in which a width W' of the textures 13 of high frequency components is between 0.1 and 20 nm and a height H' of the textures 13a of high frequency components is between 0.1 and 1 nm. Further, the textures 13a of high frequency components do not have to be recognized.

The average depth D of the depression 14 of the texture 13 may be greater than 2 nm, and the ratio H/D of the height H with respect to the average depth D of the depression 14 of the texture 13 may be less than 10.

In the above embodiment, the chemical strengthening process 25 may be omitted and the texture formation process 27 may be performed. Alternatively, the texture formation process 27 may be performed after performing a polishing process with cerium oxide and the like subsequent to the chemical strengthening process 25.

The invention claimed is:

1. A glass substrate for a magnetic recording medium formed to have a disc shape and including ridge shaped textures extending along concentric circles on a main surface, wherein the textures have a width W that is between 10 and 200 nm at a reference plane obtained by measuring a 10 µm square range with an atomic force microscope, the textures have a height H that is between 2 and 10 nm, and the textures have a ratio (Rp/RMs) of a maximum mountain height with respect to a root mean square roughness that is less than or equal to 15, wherein when the textures are cut along a plane parallel to the main surface in the 10 µm square measurement range of the atomic force microscope, the percentage of the area of the textures in the cut plane with respect to the entire area of the measurement range is defined as a bearing ratio (BR), the height of the textures when the bearing ratio is 50% is defined as a reference height, and the height of the textures from the reference height in a plurality of bearing ratios is defined as a bearing height (BH), a difference between the bearing height (BH) when the bearing ratio (BR) is 0.4% and the bearing height (BH) when the bearing ratio (BR) is 1.0% is between 0.15 nm and 0.18 nm for the textures.

2. A glass substrate for a magnetic recording medium formed to have a disc shape and including ridge shaped textures extending along concentric circles on a main surface, wherein the textures have a width W that is between 10 and 200 nm at a reference plane obtained by measuring a 10 µm square range with an atomic force microscope, the textures have a height H that is between 2 and 10 nm, and the textures have a ratio (Rp/RMs) of a maximum mountain height with respect to a root mean square roughness that is less than or equal to 15, wherein when the textures are cut along a plane parallel to the main surface in the 10 µm square measurement range of the atomic force microscope, the percentage of the area of the textures in the cut plane with respect to the entire area of the measurement range is defined as a bearing ratio (BR), the height of the textures when the bearing ratio is 50% is defined as a reference height, and the height of the textures from the reference height in a plurality of bearing ratios is defined as a bearing height (BH), a difference between the bearing height (BH) when the bearing ratio (BR) is 0.0 1% and the bearing height (BH) when the bearing ratio (BR) is 0.4% is between 0.18 nm and 0.45 nm for the textures.

3. A glass substrate for a magnetic recording medium formed to have a disc shape and including ridge shaped textures extending along concentric circles on a main surface, wherein the textures have a width W that is between 10 and 200 nm at a reference plane obtained by measuring a 10 µm square range with an atomic force microscope, the textures have a height H that is between 2 and 10 nm, and the textures have a ratio (Rp/RMs) of a maximum mountain height with respect to a root mean square roughness that is less than or equal to 15, wherein when the textures are cut along a plane parallel to the main surface in the 10 µm square measurement range of the atomic force microscope, the percentage of the area of the textures in the cut plane with respect to the entire area of the measurement range is defined as a bearing ratio (BR), the height of the textures when the bearing ratio is 50% is defined as a reference height, and the height of the textures from the reference height in a plurality of bearing ratios is defined as a bearing height (BH), wherein at least one of a difference between the bearing height (BH) when the bearing ratio (BR) is 0.4% and the bearing height (BH) when the bearing ratio (BR) is 1.0% is between 0.15 and 0.18 nm for the textures and the difference between the bearing height when the bearing ratio is 0.01% and the bearing ratio 0.4% is between 0.18 nm and 0.45 nm for the textures.

4. A glass substrate for a magnetic recording medium formed to have a disc shape and including ridge shaped textures extending along concentric circles on a main surface, wherein the textures have a width W that is between 10 and 200 nm at a reference plane obtained by measuring a 10 µm square range with an atomic force microscope, the textures have a height H that is between 2 and 10 nm, and the textures have a ratio (Rp/RMs) of a maximum mountain height with respect to a root mean square roughness that is less than or equal to 15, wherein when the textures are cut along a plane parallel to the main surface in the 10 µm square measurement range of the atomic force microscope, the percentage of the area of the textures in the cut plane with respect to the entire area of the measurement range is defined as a bearing ratio (BR), the height of the textures when the bearing ratio is 50% is defined as a reference height, and the height of the textures from the reference height in a plurality of bearing ratios is defined as a bearing height (BH), wherein at least one of a difference between the bearing height (BH) when the bearing ratio (BR) is 0.4% and the bearing height (BH) when the bearing ratio (BR) is 1.0% is between 0.15 and 0.18 nm for the textures and the difference between the bearing height (BH) when the bearing ratio (BR) is 0.0 1% and the bearing height (BH) when the bearing ratio (BR) is 0.4% is between 0.18 nm and 0.45 nm for the textures.

5. A glass substrate for a magnetic recording medium formed to have a disc shape and including ridge shaped textures extending along concentric circles on a main surface, wherein the textures have a width W that is between 10 and 200 nm at a reference plane obtained by measuring a 10 µm square range with an atomic force microscope, the textures have a height H that is between 2 and 10 nm, and the textures have a ratio (Rp/RMs) of a maximum mountain height with respect to a root mean square roughness that is less than or equal to 15, wherein when the textures are cut along a plane parallel to the main surface in the 10 µm square measurement range of the atomic force microscope, the percentage of the area of the textures in the cut plane with respect to the entire area of the measurement range is defined as a bearing ratio (BR), the height of the textures when the bearing ratio is 50% is defined as a reference height, and the height of the textures from the reference height in a plurality of bearing ratios is defined as a bearing height (BH), the difference between the bearing height (BH) when the bearing ratio (BR) is 0.4% and the bearing height (BH) when the bearing ratio (BR) is 1.0% is between 0.15 and 0.20 nm for the textures, wherein a ratio (Hv1/Hc2) of a coercive force Hc1 in a circumferential direction with respect to a coercive force Hc2 in a radial direction is greater than 1.1 and less than or equal to 1.3.

6. A glass substrate for a magnetic recording medium formed to have a disc shape and including ridge shaped textures extending along concentric circles on a main surface, wherein the textures have a width W that is between 10 and 200 nm at a reference plane obtained by measuring a 10 µm square range with an atomic force microscope, the textures have a height H that is between 2 and 10 nm, and the textures have a ratio (Rp/RMs) of a maximum mountain height with respect to a root mean square roughness that is less than or equal to 15, wherein when the textures are cut along a plane parallel to the main surface in the 10 μm square measurement range of the atomic force microscope, the percentage of the area of the textures in the cut plane with respect to the entire area of the measurement range is defined as a bearing ratio (BR), the height of the textures when the bearing ratio is 50% is defined as a reference height, and the height of the textures from the reference height in a plurality of bearing ratios is defined as a bearing height (BH), the difference between the bearing height (BH) when the bearing ratio (BR) is 0.01% and the bearing height (BH) when the bearing ratio (BR) is 0.4% is between 0.2 and 0.7 nm, and the difference between the bearing height (BH) when the bearing ratio (BR) is 0.4% and the bearing height (BH) when the bearing ratio (BR) is 1.0% is between 0.17 and 0.20 nm for the textures wherein a ratio (Hv1/Hc2) of a coercive force Hc1 in a circumferential direction with respect to a coercive force Hc2 in a radial direction is greater than 1.1 and less than or equal to 1.3.

* * * * *